US006420039B1

(12) United States Patent
Field et al.

(10) Patent No.: US 6,420,039 B1
(45) Date of Patent: Jul. 16, 2002

(54) RECORDING MEDIUM

(75) Inventors: Rex J. Field, Arcola; Michael S. Darsillo, Champaign, both of IL (US); David J. Fluck, Bel Aire, MD (US); Rudiger Laufhutte, Tuscola, IL (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/411,164

(22) Filed: Oct. 1, 1999

Related U.S. Application Data

(60) Provisional application No. 60/102,959, filed on Oct. 2, 1998.

(51) Int. Cl.[7] .............................. B32B 9/04; B32B 5/16; C01B 33/113
(52) U.S. Cl. ...................... 428/451; 428/331; 428/332; 428/446; 428/452; 516/80
(58) Field of Search ................................ 428/331, 332, 428/342, 346, 452, 403, 404, 480, 446, 451; 427/189; 516/111, 80

(56) References Cited

U.S. PATENT DOCUMENTS

| 3,007,878 A | 11/1961 | Alexander et al. |
| 3,252,917 A | 5/1966 | Mindick et al. |
| 3,620,978 A | 11/1971 | Moore |
| 3,691,089 A | 9/1972 | Janzon et al. |
| 3,719,607 A | 3/1973 | Moore |
| 3,864,142 A | 2/1975 | Kovarik |
| 3,956,171 A | 5/1976 | Moore et al. |
| 4,371,582 A | 2/1983 | Sugiyama et al. |
| 4,451,388 A * | 5/1984 | Payne ........................ 252/313 |
| 4,554,181 A | 11/1985 | Cousin et al. |
| 4,563,298 A | 1/1986 | Keiser |
| 4,595,578 A * | 6/1986 | Cohen et al. ................ 423/338 |
| 4,612,138 A | 9/1986 | Keiser |
| 5,013,603 A | 5/1991 | Ogawa et al. |
| 5,116,535 A | 5/1992 | Cochrane |
| 5,213,873 A | 5/1993 | Yasuda et al. |
| 5,372,884 A | 12/1994 | Abe et al. |
| 5,447,604 A | 9/1995 | Johansson et al. |
| 5,603,805 A | 2/1997 | Andersson et al. |
| 5,660,622 A | 8/1997 | Nikoloff |
| 5,695,820 A | 12/1997 | Davis et al. |
| 5,985,424 A * | 11/1999 | DeMatte et al. ............. 428/212 |
| 6,224,944 B1 * | 5/2001 | Tokarz et al. ................. 427/34 |
| 6,238,784 B1 * | 5/2001 | Mochizuki et al. ...... 428/321.1 |

FOREIGN PATENT DOCUMENTS

| EP | 0 442 268 | | 8/1991 |
| EP | 0442268 | * | 8/1991 |
| EP | 0586846 | * | 3/1994 |
| EP | 0 586 846 | | 3/1994 |
| EP | 0 655 346 | | 5/1995 |
| EP | 0655346 | * | 5/1995 |
| EP | 0 726 159 | | 8/1996 |
| EP | 0 764 546 | | 3/1997 |
| EP | 0764546 | * | 3/1997 |

OTHER PUBLICATIONS

Withiam, *IS&T's NIP 12:International Conference on Digital Printing Technologies*, 409–417 (1996).
Patent Abstracts of Japan, vol. 010, No. 77 (Mar. 26, 1986).
Patent Abstracts of Japan, vol. 014, No. 439 (Sep. 19, 1990) ((JP 02 172812 A) (Jul. 4, 1990)).

* cited by examiner

*Primary Examiner*—Robert Dawson
*Assistant Examiner*—Michael J Feely

(57) ABSTRACT

The present invention provides a recording medium comprising a substrate having a glossy coating thereon, wherein the glossy coating comprises cationic silica. The cationic silica comprises silica particles having a mean diameter of less than about 1 $\mu$m that have been contacted with at least one aluminum compound. The present invention also provides an aqueous dispersion of cationic silica, a coating composition comprising it, and methods of preparing the dispersion, coating composition, and recording medium.

33 Claims, 1 Drawing Sheet

RECORDING MEDIUM

CROSS REFERENCES TO RELATED APPLICATIONS

This application claims priority to U.S. patent application Ser. No. 60/102,959, filed on Oct.2, 1998.

TECHNICAL FIELD OF THE INVENTION

The present invention relates to a recording medium, a cationic silica dispersion and coating composition useful in the preparation thereof, and methods of preparing them.

BACKGROUND OF THE INVENTION

A surface coating is sometimes applied to a recording medium in order to improve its printing properties. For example, a glossy coating can impart a superior feel and a photograph-like quality to a printed image; a highly absorptive coating can reduce the smearing and rub off of an image; and a coating that immobilizes (i.e., adsorbs) ink dyes at the outer surface of the coating enhances the waterfastness and color density of a printed image.

It remains a challenge to prepare a single coating for a recording medium that is glossy and yet has good absorptive and immobilizing properties. Gloss and dye immobilization can sometimes be achieved by incorporating different types of polymeric resins into a coating. For example, a polyolefin resin, polyester resin, polyamide resin, and/or polycarbonate resin can be used to produce glossiness, while a cationic polymer resin can be used to promote the surface immobilization of an anionic dye. However, inks applied to resin-coated recording media dry relatively slowly, and often have an undesirable tendency to smear and rub off. While some pigments such as certain treated kaolin clays or treated calcium carbonates can immobilize dyes, the overall absorptivity and rate of absorption are sometimes compromised with such pigments.

A need therefore exists for a recording medium having a coating that is glossy and also has good absorptive and immobilizing properties. A need also exists for a method of preparing such a recording medium, and a dispersion and coating composition that can be used in such a method. The present invention provides such a recording medium, method, dispersion, and coating composition.

BRIEF SUMMARY OF THE INVENTION

The recording medium of the present invention comprises a substrate having a glossy coating thereon, wherein the glossy coating comprises cationic silica. The cationic silica comprises silica particles having a mean diameter of less than about 1 $\mu$m that have been contacted with an aluminum compound. The cationic silica can be characterized by its colloidal stability, i.e., by the fact that a dispersion thereof in deionized water at a concentration of about 20% by weight and a pH of about 3–4 exhibits a viscosity of less than about 1500 centipoise at relatively low shear rate, e.g., as measured in a Brookfield Model RVT digital viscometer, using spindle no. 5 at 100 RPM, after the dispersion is allowed to stand at a temperature of about 25° C. for 180 days immediately following the preparation thereof. The dispersion of the present invention typically has a zeta potential of at least about 50% of the maximum zeta potential in the absence of a substantial excess of aluminum.

The coating of the inventive recording medium has an excellent rate of liquid absorption, a relatively high liquid absorption capacity, and an excellent dye-immobilizing, glossy surface. Images applied to the glossy coating of the inventive recording medium are waterfast, have a high color density, and dry relatively quickly.

The method of preparing the recording medium of the present invention comprises:
(a) providing a substrate,
(b) coating the substrate with a coating formulation comprising the aforementioned cationic silica to provide a coated substrate, and
(c) drying the coated substrate to form the recording medium.

The present invention also provides an aqueous dispersion of cationic silica, wherein:
(a) the cationic silica comprises silica particles that have been contacted with one or more aluminum compounds,
(b) the mean diameter of the silica particles is from about 100 nm to about 1 $\mu$m,
(c) the pH of the dispersion is from about 2 to about 6, and
(d) the cationic silica content of the dispersion is from about 5% to about 50% by weight, and the aqueous dispersion preferably is characterized by:
(e) a viscosity of less than about 1500 centipoise at relatively low shear rate after it is allowed to stand at a temperature of about 25° C. for 180 days immediately following the preparation thereof, and
(f) a zeta potential of at least about 50% of the maximum zeta potential without the presence of a substantial excess of aluminum.

The present invention further provides a method of preparing the aforementioned aqueous dispersion of cationic silica. The method of the present invention comprises:
(a) providing an aqueous suspension of silica particles, wherein the mean diameter of the particles is less than about 1 $\mu$m, and
(b) contacting the silica particles in the suspension with at least one aluminum compound to form a mixture, wherein the zeta potential of the mixture increases rapidly during the initial contacting, but plateaus (i.e., increases slowly) during subsequent contacting, and the contacting is continued until the zeta potential of the mixture plateaus, at which time the contacting is discontinued to provide the aqueous dispersion of cationic silica.

The present invention further provides a coating composition comprising a suitable binder and the aqueous cationic silica dispersion of the present invention.

The inventive method of preparing an aqueous dispersion of cationic silica overcomes at least some of the limitations of previous methods in a number of ways. For example, it is not necessary to rigorously remove electrolytes from the dispersion. Also, dispersion stabilizers such as divalent metals, ammonia, and bicarbonate are not needed. These and other advantages of the present invention, as well as additional inventive features, will be apparent from the description of the invention provided herein.

DESCRIPTION OF THE PREFERRED EMBODIMENTS

Figure 1:
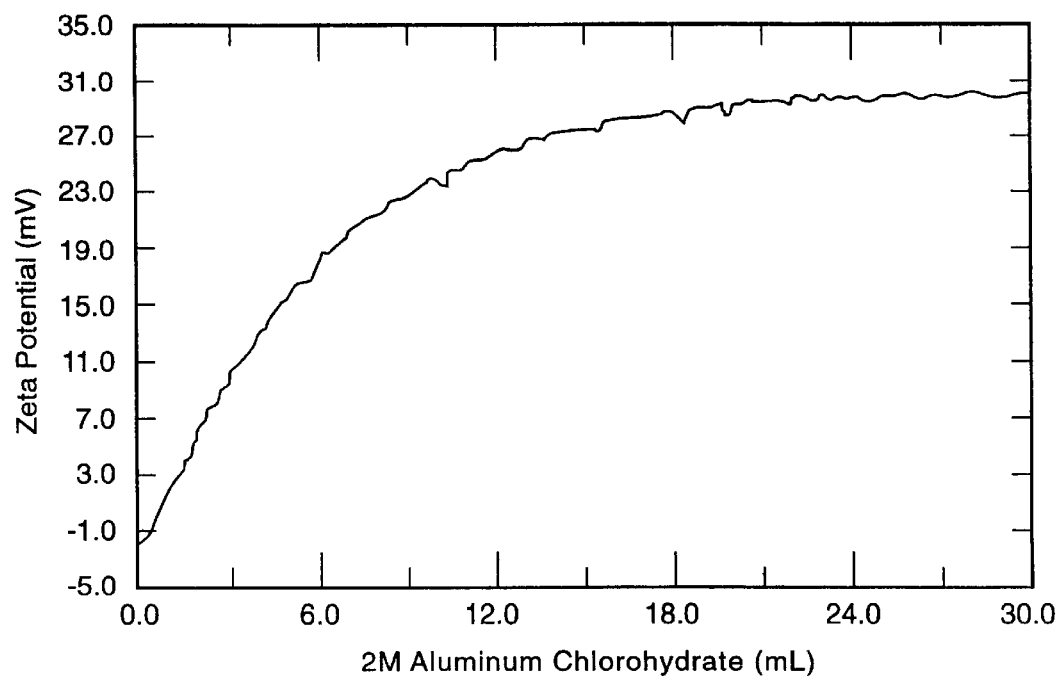
FIG. 1 is a plot of the zeta potential response of a 10% (by weight) aqueous silica dispersion titrated with a 2 M aqueous aluminum chlorohydrate solution.

The present invention provides a recording medium, a method for the preparation of a recording medium, and a dispersion of cationic silica and coating composition useful in the preparation of a recording medium.

Recording Medium

The present invention provides a recording medium comprising a substrate having a coating thereon, wherein the coating comprises cationic silica. The cationic silica comprises silica particles having a mean diameter of less than about 1 µm that have been contacted with an aluminum compound (i.e., one or more aluminum compounds), alone or in a composition with other components. Preferably, the coating is a glossy coating.

The inventive recording medium comprises a substrate, which can be either transparent or opaque, and which can be made of any suitable material. Examples of such materials include, but are not limited to, films or sheets of polyester resins (e.g., poly(ethylene terephthalate)), diacetate resins, triacetate resins, acrylic resins, polycarbonate resins, polyvinyl chloride resins, polyimide resins, cellophane and celluloid, glass sheets, metal sheets, plastic sheets, paper (e.g., cellulose paper, synthetic paper), coated paper (e.g., resin-coated paper), pigment-containing opaque films, and foamed films.

The substrate used in the recording medium of the present invention has a glossy coating thereon, which can be of any suitable thickness. In particular, the coating is preferably from about 1 µm to about 50 µm in thickness, more preferably from about 5 µm to about 40 µm in thickness, and most preferably from about 10 µm to about 30 µm in thickness. The recording medium of the present invention provides excellent gloss and also has good ink absorption, dye immobilization, high rate of liquid absorption, excellent waterfastness, and overall liquid absorption capacity. Moreover, the recording medium of the present invention provides excellent image quality, particularly when used in ink jet printing applications.

In certain embodiments of the present invention the inventive recording medium comprises a substrate having more than one layer of coating, which can be the same or different. However, at least one of the coating layers comprises cationic silica with properties as described herein.

For example, the recording medium of the present invention can comprise a substrate coated with one or more ink-receptive layers (e.g., comprising anionic silica) and/or one or more resinous layers (e.g., a glossy, laminated surface layer). Even when the recording medium of the present invention comprises such additional layers of coating, it has been found that the above-described glossy coating comprising cationic silica provides sufficient ink absorption, dye immobilization, and gloss for the vast majority of printing applications.

The cationic silica comprises silica particles that have been contacted with one or more aluminum compounds. The particles can comprise pyrogenic silica, silica gel (e.g., aerogel and xerogel), precipitated silica, colloidal silica (e.g., a silica sol), and combinations thereof, with pyrogenic silica being preferred.

Particles of pyrogenic silica are aggregates of smaller, primary particles. Although the primary particles are not porous, the aggregates contain a significant void volume, and are capable of rapid liquid absorption. These void-containing aggregates enable a coating to retain a significant capacity for liquid absorption even when the aggregate particles are densely packed, which minimizes the interparticle void volume of the coating.

The capacity for liquid absorption of the glossy coating of the recording medium of the present invention can be measured by any suitable method. For example, the capacity for liquid absorption can be measured by contacting a massed test sample of the inventive recording medium with a 1:1 solution of polyethylene glycol (e.g., PEG 400) and water for 10 seconds at a temperature of about 25° C. The excess solution is then removed from the surface of the sample with a blotting paper, the test sample is re-weighed, and the mass of the solution absorbed and held by the glossy coating is calculated and expressed in terms of $g/m^2$.

Alternatively, the capacity for liquid absorption of the coating can be measured as a function of porosity. Porosity can be measured by any suitable method, for example, by using a Parker Print Surf (PPS) tester or by measuring the total intrusion volume of a liquid (e.g., mercury) into the glossy coating applied to a non-porous substrate (e.g., polyethylene). It will be appreciated that the total intrusion volume of a liquid for a particular coating (and, therefore, the porosity) can be a function of variables that influence the structure of the coating, for example, binder type, pigment-to-binder ratio, pigment particle size, calendering, and the like. When liquid intrusion volume is used to measure the porosity, it is preferably determined by measuring the total intrusion volume of mercury. In this regard, the glossy coating of the recording medium of the present invention, when the substrate is a non-porous substrate, preferably has a total mercury intrusion volume of at least about 0.3 ml/g. More preferably, the glossy coating has a total mercury intrusion volume of at least about 0.5 ml/g, still more preferably at least about 0.8 ml/g, and most preferably about 1 ml/g or greater.

The rate of liquid absorption can be measured by any suitable method, for example, by applying a droplet of a liquid (e.g., distilled water) to the coating surface and measuring the change in the angle of the droplet with respect to the surface (contact angle) over time. Preferably, the contact angle of distilled water, when applied to the glossy coating of the recording medium of the present invention, decreases by at least about 5° over the first five minutes. More preferably, the contact angle decreases by at least about 7° over the first five minutes. Most preferably, the contact angle of distilled water, when applied to the glossy coating of the recording medium of the present invention, decreases by at least about 10° over the first five minutes.

The size of the silica particles of which the cationic silica is comprised impacts the glossiness of the coating. The glossiness of the recording medium of the present invention can be measured in terms of the 75° specular gloss, e.g., according to JIS P 8142, or an equivalent U.S. standard, using a gloss photometer, for example, a VGS-1001, manufactured by Nihon Denshoku Kogyosha, a Hunter 75° Gloss Meter, a Technidyne Glossmeter (e.g., Model T480A), or the like. It is preferred that the recording medium of the present invention has a 75° specular gloss of at least about 15%. More preferably, the recording medium of the present invention has a glossiness of at least about 25%, even more preferably at least about 35%, still more preferably at least about 45%. In some instances, the glossiness is least about 55%, and even at least about 65%.

In order to maximize glossiness, it is preferred that the mean diameter of the silica particles is less than about 1 µm. More preferably, the mean silica particle diameter is less than about 500 nm, and most preferably the mean diameter of the silica particles is less than about 400 nm.

It is highly preferred that at least about 80% (e.g., at least about 90%) or substantially all of the silica particles have diameters smaller than the mean diameter values set forth above. In other words, it is highly preferred that at least about 80% (e.g., at least about 90%) or substantially all of the particles have diameters of less than about 1 μm, more highly preferred that at least about 80% (e.g., at least about 90%) or substantially all of the particles have diameters of less than about 500 nm, and most highly preferred that at least about 80% (e.g., at least about 90%) or substantially all of the particles have diameters of less than about 400 nm.

In certain preferred embodiments, such as when the cationic silica comprises particles of pyrogenic silica that have been contacted with at least one aluminum compound, it is preferred that the mean diameter of the silica particles is at least about 100 nm (e.g., particles having a mean diameter of from about 100 nm to about 1 μm, more preferably from about 100 nm to about 500 nm, and most preferably from about 100 nm to about 400 nm, especially from about 150 nm to about 250 nm). In certain of these embodiments, at least about 80% (e.g., at least about 90%) or substantially all of the silica particles have diameters of at least about 100 nm (e.g., substantially all of the particles have diameters of from about 100 nm to about 1 μm, more preferably from about 100 nm to about 500 nm, and most preferably from about 100 nm to about 400 nm, especially from about 150 nm to about 250 nm).

In other embodiments of the present invention, such as when the cationic silica comprises particles of a colloidal silica sol, the silica particles preferably have a mean diameter of less than about 200 nm, more preferably less than about 100 nm, and most preferably less than about 50 nm. In certain of these embodiments it is preferred that at least about 80% (e.g., at least about 90%) or substantially all of the silica particles have diameters of less than about 200 nm, more preferably less than about 100 nm, and most preferably less than about 50 nm.

The cationic silica can comprise silica particles having any suitable range of individual particle diameters, such as a relatively broad range or a relatively narrow range. For instance, the cationic silica can comprise a mixture of pyrogenic and colloidal silica particles that have been contacted with one or more aluminum compounds. The particles also can be monodispersed. By monodispersed is meant that the individual particles have diameters that are substantially identical. For example, substantially all monodispersed 55 nm particles have diameters in the range of from about 50 nm to about 60 nm.

It should be noted that when the silica particles used in the present invention comprise aggregates of fused (i.e., aggregated) primary particles, as in pyrogenic silica, the diameter values set forth above refer to the diameters of the aggregates. With respect to the primary particles that make up these silica aggregates, in certain embodiments of the present invention, such as when a glossy coating having a relatively high rate of and capacity for liquid absorption is desired, it is preferred that the primary particles have a mean diameter of less than about 100 nm (e.g., from about 1 nm to about 100 nm). More preferably, the primary particles have a mean diameter of less than about 50 nm (e.g., from about 1 nm to about 50 nm), even more preferably less than about 30 nm (e.g., from about 1 nm to about 30 nm), and most preferably less than about 20 nm (e.g., from about 5 nm to about 15 nm). In certain of these embodiments it is preferred that at least about 80% (e.g., at least about 90%) or substantially all of the primary particles have diameters smaller than the mean diameter values set forth above. In other words, it is preferred that at least about 80% (e.g., at least about 90%) or substantially all of the primary particles have diameters of less than about 100 nm (e.g., from about 1 nm to about 100 nm), more preferred that at least about 80% (e.g., at least about 90%) or substantially all of the primary particles have diameters of less than about 50 nm (e.g., from about 1 nm to about 50 nm), even more preferred that at least about 80% (e.g., at least about 90%) or substantially all of the primary particles have diameters of less than about 30 nm (e.g., from about 1 nm to about 30 nm), and most preferred that at least about 80% (e.g., at least about 90%) or substantially all of the primary particles have diameters of less than about 20 nm (e.g., from about 5 nm to about 15 nm).

The cationic silica used in the glossy coating of the recording medium of the present invention enhances the ability of the coating to immobilize (i.e., adsorb) and display dye molecules at the surface of the coating. The cationic silica comprises silica particles having dimensions as set forth above that have been contacted with one or more aluminum compounds. Any suitable aluminum compound can be used. Preferred aluminum compounds include aluminum halides and aluminum nitrates, with aluminum chlorides being especially preferred. Highly preferred are aluminum chlorides and aluminum nitrates of the formula $Al(OH)_2X$ to $Al_3(OH)_8X$, where X is Cl or $NO_3$, and most preferably, the silica particles are contacted with an aluminum chlorohydrate ($Al_2(OH)_5Cl$, more specifically $Al_2(OH)_5Cl\cdot 2H_2O$).

The aluminum compound can be a solid, liquid, or gas. The aluminum compound can be combined with one or more other substances, such as a solvent therefor, to form an aluminum composition.

According to the present invention, the contact between the silica particles and the aluminum compound can be achieved in any suitable manner. For instance, the contact can comprise mixing a silica suspension with a solid aluminum compound, as when a suspension of silica in a suitable liquid (e.g., water) is contacted with one or more aluminum compounds. For example, aluminum chlorohydrate can be added to an aqueous silica suspension as a dry solid. In certain embodiments it is preferred to contact the silica particles with one or more aluminum compounds and a suitable solvent therefor (e.g., water). For example, a solution of aluminum chlorohydrate in water can be added to an aqueous suspension of silica particles.

The glossy coating of the recording medium of the present invention can comprise a single variety of cationic silica or cationic silica having a range of properties (e.g., particle sizes, surface areas, net charge, etc.). In other words, the coating can comprise cationic silica comprising silica particles, wherein the particles have a variety of sizes and/or are derived from disparate sources (e.g., pyrogenic, colloidal, precipitated, etc.), and have been independently or jointly contacted with any number of different aluminum compounds using any suitable methods. The coating can comprise a single variety of this cationic silica or any suitable combination of the contacted particles.

It is believed that contacting a silica particle with an aluminum compound as described herein causes a suitable aluminum compound to become associated with or bind to the surface of the silica particle, possibly covalently or through an electrostatic interaction, to form a cationic coating thereon (i.e., cationic silica). Evidence of this cationic coating is provided by measuring the zeta potential of a dispersion of the cationic silica (e.g., as illustrated in FIG. 1). For example, a deionized water dispersion of the cationic silica at a concentration of about 20% by weight and a pH of about 3–4 can be measured. It is preferred that when such a dispersion comprises the cationic silica of which the glossy coating of the recording medium of the present invention is comprised, the dispersion is characterized by the fact that it has a zeta potential that changes by less than about 25% when the aluminum content of the dispersion is increased by about 50% by weight via the addition thereto of an aluminum compound(s) that is substantially identical to the aluminum compound(s) with which the silica particles have been contacted. More preferably, the zeta potential of such a dispersion changes by less than about 15% when the aluminum content of the dispersion is increased by about 50% by weight as described herein, even more preferably the zeta potential of such a dispersion changes by less than about 10% when the aluminum content of the dispersion is increased by about 50% by weight as described herein, and most preferably the zeta potential of such a dispersion changes by less than about 5% when the aluminum content of the dispersion is increased by about 50% by weight via the addition thereto of an aluminum compound(s) that is substantially identical to the aluminum compound(s) with which the silica particles have been contacted.

The dispersion of the cationic silica of the present invention having a cationic silica content of about 20% by weight in deionized water and a pH of about 4 preferably is characterized by its zeta potential relative to the maximum obtainable zeta potential without the presence of a substantial excess (preferably, without any excess) of aluminum as described herein. Generally, the zeta potential of the aqueous dispersion is at least about 50% of the maximum zeta potential without the presence of a substantial excess of aluminum. Typically, the zeta potential of the aqueous dispersion is at least about 60% of the maximum zeta potential without the presence of a substantial excess of aluminum, and more typically the zeta potential is at least about 70% of the maximum zeta potential without the presence of a substantial excess of aluminum. Preferably, the aqueous dispersion of cationic silica exhibits a zeta potential of at least about 80% of the maximum zeta potential without the presence of substantial excess of aluminum. More preferably, the dispersion exhibits a zeta potential of at least about 90% of the maximum zeta potential without the presence of a substantial excess of aluminum and, even more preferably, a zeta potential of at least about 95% of the maximum zeta potential without the presence of a substantial excess of aluminum. Most preferably, the zeta potential of the dispersion is at least about 98% (e.g., about 100%) of the maximum zeta potential without the presence of a substantial excess of aluminum.

An aqueous dispersion of the cationic silica of which the glossy coating of the recording medium of the present invention is comprised having properties as set forth above is also characterized by the fact that it is relatively colloidally stable (i.e., slow to gel). The stability of the aqueous dispersion of the present invention can be determined by measuring the viscosity of the dispersion after it is suitably prepared and then allowed to stand undisturbed (i.e., without stirring or any other agitation) for a certain length of time. The viscosity can be measured, for example, using a Brookfield viscometer (manufactured by Brookfield Engineering Laboratories, Inc., Stoughton, Mass.) and a suitable spindle therefor. For example, low shear rate viscosity can be measured using a Brookfield LVT viscometer (spindle no. 2, 60 rpm, two minute spin at 25° C.), a Brookfield Model RV viscometer at 100 RPM, spindle #4, after 30 seconds, or a Brookfield Model RVT digital viscometer, spindle #5 at 100 RPM. High shear viscosity (sometimes referred to as "apparent viscosity") can be measured with a HERCULES® High-Shear Viscometer using a suitable spindle (e.g., FF Bob measuring geometry, at 4400 RPM). Alternatively, the viscosity may be measured pursuant to ASTM D 2196 (06.01) entitled "Rheological Properties of Non-Newtonian Materials by Rotational (Brookfield) Viscometer."

It is preferred that the viscosity (at low shear rate) of such a dispersion increases by less than about 50% when the dispersion is allowed to stand at a temperature of about 25° C. for 60 days, 90 days, 120 days, 180 days, and/or 270 days immediately following the preparation thereof. More preferably, the viscosity changes by less than about 30% when the dispersion is allowed to stand at a temperature of about 25° C. for 60 days, 90 days, 120 days, 180 days, and/or 270 days following the preparation thereof. Most preferably, the viscosity changes by less than about 20% when the dispersion is allowed to stand at a temperature of about 25° C. for 60 days, 90 days, 120 days, 180 days, and/or 270 days immediately following the preparation thereof.

The viscosity of an aqueous dispersion of the cationic silica of the present invention having a cationic silica content of about 20% by weight and a pH of about 3–4 preferably is less than about 1500 centipoise at relatively low shear rate after the dispersion is allowed to stand at a temperature of 25° C. for 60 days, 90 days, 120 days, 180 days, and/or 270 days immediately following the preparation thereof. It is preferred that the viscosity of the aqueous dispersion is less than about 500 centipoise after the dispersion is allowed to stand at a temperature of 25° C. for 60 days, 90 days, 120 days, 180 days, and/or 270 days immediately following the preparation thereof. More preferably, the viscosity is less than about 200 centipoise after the dispersion is allowed to stand at a temperature of 25° C. for 60 days, 90 days, 120 days, 180 days, and/or 270 days immediately following the preparation thereof, and most preferably, the viscosity is less than about 150 centipoise after it is allowed to stand at a temperature of 25° C. for 60 days, 90 days, 120 days, 180 days, and/or 270 days immediately following the preparation thereof.

Organic dyes, such as those used in ink-jet inks, often contain ionizable functional groups (e.g., $SO_3H$, $COOH$, $PO_3H_2$, etc.), which increase the water solubility of the dyes. The dyes become negatively charged when these functional groups ionize in water (to $SO_3^-$, $COO^-$, $PO_3^{2-}$), and therefore experience strong electrostatic attraction to the cationic silica in the glossy coating of the recording medium of the present invention. Therefore, even though the ink can be rapidly absorbed into the coating via the pores of the cationic silica, the anionic dye molecules can be separated from the ink, and immobilized at the coating surface. As such, the coating of the recording medium of the present invention has excellent dye immobilizing ability, which promotes desirable qualities, for example, superior image quality.

Dye adhesion to the surface of a recording medium can be quantified by measuring the optical density and waterfastness of a test sample of the recording medium to which an aqueous ink-jet ink comprising an anionic dye has been applied. For example, a test sample having an ink coverage of about 12 $g/m^2$ over an area of about 90 $cm^2$ can be cut in half and tested in the following manner. One minute after applying the ink, one of the halves is soaked in deionized water for one minute and then repeatedly dipped in and out of the water to remove all dissolved ink from the sample. After drying, a densitometer (e.g., a MacBeth 512 densitometer) can be used to measure the image intensity at a number of positions (e.g., at ten random positions) on each half of the test sample, and the values for each half averaged. The optical density of the recording medium is the average image intensity of the half of the test sample that was not soaked in water. The waterfastness can be reported as:

$$1 - \left[ \frac{(\text{ave. I.I. of unsoaked}) - (\text{ave. I.I. of soaked})}{(\text{ave. I.I. of unsoaked})} \right]$$

wherein ave. I.I. is the average image intensity of each half of the test sample (i.e., the half that was soaked in water and the half that was not soaked in water). Waterfastness values that are less than one, when calculated in this fashion, generally indicate loss of ink from the coating.

Alternatively, waterfastness can be evaluated in terms of retained optical density. For example, a test print can be evaluated by immersing a sample in deionized water for 5 minutes with light agitation, drying the sample, and comparing the color density of the dry soaked sample with that of an unsoaked sample (as indicated above) by measuring color density with a suitable densitomer (e.g., X-Rite® 938 Spectrodensitometer). Waterfastness can then be expressed in terms of the percentage of optical density retained by the soaked sample relative to the unsoaked sample.

The recording medium of the present invention exhibits excellent waterfastness. For example, the recording medium of the present invention typically retains at least about 50% of the optical density after immersion in deionized water for 5 minutes with light agitation. Preferably, after it is immersed in deionized water for 5 minutes with light agitation, the recording medium of the present invention retains at least about 60% of the optical density of the printed image, more preferably at least about 70% of the optical density, still more preferably at least about 80% of the optical density, and most preferably at least about 90% of the optical density is retained (e.g., about 95% or even 100% of the optical density). In a particularly preferred embodiment, the recording medium of the present invention retains 100% of the optical density of a printed image after being immersed in deionized water for 5 minutes with light agitation.

It is preferred that the optical density of an image that has been applied to the glossy coating of the recording medium of the present invention, when measured as set forth above, is at least about 1.0. It is more preferred that the optical density is at least about 1.1, even more preferably at least about 1.2, still more preferably at least about 1.3, yet more preferably at least about 1.4, and most preferably at least about 1.5. It is preferred that the waterfastness of the glossy coating of the recording medium of the present invention, when measured as set forth above, is at least about 0.7. It is more preferred that the waterfastness is at least about 0.8, even more preferably at least about 0.9, still more preferably at least about 0.95, yet more preferably at least about 0.98, and most preferably at least about 0.99.

In certain embodiments of the present invention, the glossy coating of the inventive recording medium comprises one or more pigments in addition to cationic silica, such as calcium carbonate, clays, aluminum silicates, urea-formaldehyde fillers, and the like. Other suitable pigments include silica (e.g., colloidal or pyrogenic silica), alumina (e.g., alumina sols, colloidal alumina, cationic aluminum oxide or hydrates thereof, pseudoboehmite, etc.), magnesium silicate, magnesium carbonate, kaolin, talc, calcium sulfate, barium sulfate, titanium dioxide, zinc oxide, zinc sulfide, zinc carbonate, satin white, diatomaceous earth, calcium silicate, aluminum hydroxide, lithopone, zeolite, hydrated halloycite, magnesium hydroxide, polyolefins (e.g., polystyrene, polyethylene, polypropylene, etc.), plastics (e.g., acrylic), urea resin, and melamine resin.

The glossy coating of the recording medium of the present invention preferably comprises one or more binders, which serve to bind the cationic silica to the substrate. If one or more binders are used, the relative ratio of the total amount of pigment (e.g., cationic silica) to the total amount of binder(s) is preferably from about 1:1 to about 10:1 by weight, more preferably from about 1.5:1 to about 8:1 by weight, even more preferably from about 2:1 to about 6:1 by weight, an d most preferably from about 2:1 to about 4:1 by weight (e.g., about 3:1 or 4:1 by weight). Preferred binders include, but are not limited to, polyvinyl alcohol, polyvinyl acetate, polyvinyl acetal, polyvinyl pyrrolidone, oxidized starch, etherified starch, cellulose derivatives (e.g., carboxymethyl cellulose, hydroxyethyl cellulose, etc.), casein, gelatin, soybean protein, silyl-modified polyvinyl alcohol, conjugated diene copolymer latexes (e.g., maleic anhydride resin, styrene-butadiene copolymer, methyl methacrylate-butadiene copolymers, etc.), acrylic polymer latexes (e.g., polymers and copolymers of acrylic esters and methacrylic esters, polymers and copolymers of acrylic acid and methacrylic acid, etc.), vinyl polymer latexes (e.g., ethylene-vinyl acetate copolymer), functional group-modified polymer latexes obtained by modifying the above-mentioned various polymers with monomers containing functional groups (e.g., carboxyl groups), aqueous binders such as thermosetting resins (e.g., melamine resin, urea resin, etc.), synthetic resin binders such as polymethyl methacrylate, polyurethane resin, polyester resin (e.g., unsaturated polyester resin), amide resin, vinyl chloride-vinyl acetate copolymer, polyvinyl butyral, and alkyd resin, with polyvinyl alcohol being most preferred.

The glossy coating of the recording medium of the present invention also can comprise one or more other additives, such as surfactants (e.g., cationic surfactants, anionic surfactants such as long-chain alkylbenzene sulfonate salts and long-chain, preferably branched chain, alkylsulfosuccinate esters, nonionic surfactants such as polyalkylene oxide ethers of long-chain, preferably branched-chain alkyl group-containing phenols and polyalkylene oxide ethers of long-chain alkyl alcohols, and fluorinated surfactants), hardeners (e.g., active halogen compounds, vinylsulfone compounds, aziridine compounds, epoxy compounds, acryloyl compounds isocyanate compounds, etc.), pigment dispersants, thickeners (e.g., carboxymethyl cellulose (CMC)), flowability improvers, antifoamers (e.g., octyl alcohol, silicone-based antifoamers, etc.), foam inhibitors, releasing agents, foaming agents, penetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antifungal agents, yellowing inhibitors (e.g., sodium hydroxymethanesulfonate, sodium p-toluenesulfinate, etc.), ultraviolet absorbers (e.g., benzotriazole compounds having a hydroxy-dialkylphenyl group at the 2-position), antioxidants (e.g., sterically hindered phenol compounds), antistatic agents, pH regulators (e.g., sodium hydroxide, sodium carbonate, sulfuric acid, hydrochloric acid, phosphoric acid, citric acid, etc.), water-resisting agents, wet strengthening agents, and dry strengthening agents.

Method of Preparing a Recording Medium

The present invention also provides a method of preparing a recording medium, wherein the recording medium comprises a substrate having a glossy coating thereon, wherein the glossy coating comprises cationic silica. The inventive method comprises:

(a) providing a substrate, (b) coating the substrate with a coating formulation comprising cationic silica to provide a coated substrate, wherein the cationic silica comprises silica particles having a mean diameter of less than about 1 µm that have been contacted with an aluminum compound (i.e., one or more aluminum compounds), and (c) drying the coated substrate to form the recording medium.

As described herein, a deionized water dispersion of the cationic silica used in the method of the present invention at a concentration of about 20% by weight and a pH of about 3–4 can be characterized by its zeta potential and viscosity.

The typical and preferred ranges for the zeta potential and viscosity of such a dispersion are discussed herein. Again, this aqueous dispersion has (i) a zeta potential of at least about 50% of the maximum zeta potential without the presence of a substantial excess of aluminum, and (ii) a viscosity of less than about 1500 centipoise after the dispersion is allowed to stand at a temperature of 25° C. for 60 days, 90 days, 120 days, 180 days, and/or 270 days immediately following the preparation thereof.

The substrate, cationic silica, coating constituents (e.g., binders, surfactants, resins, etc.) and coating properties (e.g., thickness, gloss, absorptiveness, dye immobilization, etc.) of a recording medium prepared in accordance with the present inventive method desirably are as described herein with respect to the recording medium of the present invention. The coating formulation (i.e., the coating composition) used in the present inventive method comprises a suitable carrier and cationic silica, with properties as described herein, and preferably comprises any other constituents of which the glossy coating is to be comprised (e.g., binders, surfactants, resins, etc., as described herein). It is preferred that the coating formulation comprises cationic silica in the form of an aqueous dispersion as described herein.

The carrier can be any suitable fluid or combination of fluids in which the cationic silica and any other coating constituents can be mixed and applied to a substrate. Preferred carriers have a relatively high vapor pressure to accelerate the drying of the coating formulation after application, and preferred examples include, but are not limited to, organic solvents (e.g., alcohols) and water, with water being most preferred.

The relative amounts of carrier and solids (e.g., cationic silica) in the coating formulation affects a number of properties of the formulation (e.g., viscosity, ease of application, drying rate, etc.) and the resulting dry coating (e.g., absorption capacity, degree of cracking, etc.). Although any suitable solids content can be utilized, it is sometimes desirable for the applied coating formulation to dry relatively quickly to form a non-tacky glossy coating, and in such cases, it is often preferred that the solids content of the coating formulation is increased. In these embodiments of the present invention, it is preferred that the solids content of the coating formulation is at least about 10% by weight, more preferably at least about 20% by weight, and most preferably the solids content is at least about 30% by weight.

As indicated herein, the apparent viscosity of a coating formulation (e.g., a formulation having a solids content of about 25% by weight) can be measured in a high shear HERCULES® High-Shear Viscometer (rheometer) at 4400 rpm (FF Bob measuring geometry) at a temperature of about 25° C. When measured in this manner, it is preferred that the apparent viscosity of the coating formulation used in the method of the present invention is less than about 150 centipoise, more preferably less than about 100 centipoise, and most preferably less than about 75 centipoise (e.g., about 50–70 centipoise).

The coating formulation can be applied to the substrate using any suitable method or combination of methods to provide the coated substrate. Suitable methods include, but are not limited to, roll coating, blade coating, air knife coating, rod coating (e.g., using a Meyer rod or the like), bar coating, cast coating, gate roll coating, wire bar coating, short-dowel coating, slide hopper coating, curtain coating, flexographic coating, gravure coating, Komma coating, size press coating in the manner of on- or off-machine, and die coating, with rapid, inexpensive methods such as rod coating and blade coating being preferred.

After application to the substrate, the coating formulation can be dried using any suitable method or combination of methods to provide the recording medium. Suitable drying methods include, but are not limited to, air or convection drying (e.g., linear tunnel drying, arch drying, air-loop drying, sine curve air float drying, etc.), contact or conduction drying, and radiant-energy drying (e.g., infrared drying and microwave drying).

Aqueous Dispersion of Cationic Silica

A coating formulation comprising cationic silica is used in the inventive method of preparing a recording medium. As described herein, the cationic silica is preferably dispersed in an aqueous medium. Accordingly, the present invention provides an aqueous dispersion of cationic silica and a method for its preparation.

The aqueous dispersion of the present invention comprises cationic silica and water, wherein:

(a) the cationic silica comprises silica particles that have been contacted with an aluminum compound (i.e., one or more aluminum compounds), (b) the mean diameter of the silica particles is from about 100 nm to about 1 $\mu$m, (c) the pH of the dispersion is from about 2 to about 6, and (d) the cationic silica content of the dispersion is from about 5% to about 50% by weight, and the aqueous dispersion preferably is characterized by:

(e) a viscosity of less than about 1500 centipoise at relatively low shear rate after the dispersion is allowed to stand at a temperature of about 25° C. for 60 days immediately following the preparation thereof, and (f) a zeta potential of at least about 50% of the maximum zeta potential without the presence of a substantial excess of aluminum.

The aqueous dispersion of the present invention comprises cationic silica comprising silica particles from any suitable source (e.g., pyrogenic, precipitated, colloidal sols, gels, etc.) that have been contacted with one or more aluminum compounds, wherein the aluminum compound and contacting methods are as described herein. It is preferred that the inventive aqueous dispersion comprises cationic silica comprising pyrogenic silica particles that have been contacted with the aluminum compound(s). The inventive dispersion is advantageous for many reasons. For example, the physical properties of the cationic silica (e.g., particle size, surface area, net charge, etc.) can be optimized over a wide range to suit specific applications (e.g., coating formulations). Also, the inventive dispersion is stable, is easily handled, and if desired, can be transported from the site of preparation for use elsewhere. The stability characteristics of the present inventive aqueous dispersion are as described above in conjunction with the recording medium and its preparation.

As utilized herein, the term "dispersion" means any suspension of solid particles (e.g., cationic silica) in a liquid medium (e.g., water), wherein the particles remain suspended in the medium (i.e., are colloidally stable in that the particles do not settle to the bottom of a container) for at least about 24 hours when the suspension is allowed to stand at a temperature of about 25° C. following the preparation thereof. While a dispersion can comprise particles of any size, the term "sol" (e.g., colloidal sol) as utilized herein means a dispersion comprising particles having diameters of less than about 100 nm.

The cationic silica of which the aqueous dispersion of the present invention is comprised is as described herein with respect to the recording medium of the present invention, with the following exception. The aqueous dispersion of the present invention comprises cationic silica comprising silica particles having a mean diameter of from about 100 nm to about 1 µm. In other words, the cationic silica in the aqueous dispersion of the present invention is not derived exclusively from a silica sol (i.e., the cationic silica does not consist essentially of a silica sol that has been contacted with one or more aluminum compounds, as described herein). In accordance with the present invention, a dispersion comprising cationic silica derived from a silica sol also can comprise cationic silica derived from silica particles having diameters of from about 100 nm to about 1 µm, in a suitable ratio such that the mean diameter of the totality of the silica particles of which the cationic silica in the inventive dispersion is comprised is at least about 100 nm (i.e., the mean diameter is from about 100 nm to about 1 µm).

It is preferred that the aqueous dispersion of the present invention comprises cationic silica comprising silica particles having a mean diameter of from about 100 nm to about 500 nm that have been contacted with an aluminum compound(s) as described herein. It is more preferred that the cationic silica comprises silica particles having a mean diameter of from about 100 nm to about 400 nm, and most preferred that the cationic silica comprises silica particles having a mean diameter of from about 100 nm to about 300 nm (e.g., from about 150 nm to about 250 nm). In certain embodiments of the present invention the inventive aqueous dispersion comprises cationic silica comprising silica particles that have been contacted with an aluminum compound, wherein at least about 80% (e.g., at least about 90%) or substantially all of the particles have diameters of from about 100 nm to about 1 µm (e.g., from about 100 nm to about 500 nm, from about 100 nm to about 400 nm, or from about 150 nm to about 250 nm).

As set forth above, a dispersion comprises particles suspended in a liquid medium. According to the present invention it is preferred that the inventive aqueous dispersion comprises water, more preferably deionized water. The aqueous dispersion of the present invention also can comprise any number of suitable water-miscible liquids, such as one or more water-miscible alcohols (e.g., methanol, ethanol, etc.) or ketones (e.g., acetone) in addition to water.

The aqueous dispersion of the present invention is most stable (i.e., most resistant to thickening and/or gelling) at a pH of from about 2 to about 6. In certain embodiments, such as when maximum dispersion stability is desired, it is preferred that the pH of the dispersion is about 3–5, more preferably about 3–4 or 3.5–4.5. The pH of the dispersion can be adjusted using any suitable method, such as via the addition of an acid (e.g., mineral acid, acidic cation exchange resin, etc.) or a base (e.g., an alkali metal hydroxide, basic anion exchange resin, etc.).

The aqueous dispersion of the present invention comprises cationic silica in an amount of from about 5% to about 50% by weight (e.g., from about 10% to about 30% by weight). Embodiments of the present invention that are particularly useful in such applications include aqueous dispersions having a cationic silica content of at least about 10% by weight (i.e., from about 10% to about 50% by weight), more preferably at least about 20% by weight (i.e., from about 20% to about 50% by weight), and most preferably at least about 30% by weight (i.e., from about 30% to about 50% by weight). In certain other embodiments, such as when a dispersion of maximum stability is desired, the aqueous dispersion preferably comprises less than about 35% by weight of cationic silica (e.g., from about 5% to about 35% by weight), more preferably less than about 25% by weight (e.g., from about 5% to about 25% by weight), and most preferably less than about 15% by weight (e.g., from about 5% to about 15% by weight). In certain applications, such as when the inventive dispersion is used in a coating formulation, it may be desirable to remove the liquid medium from the dispersion (e.g., water) to provide dry cationic silica.

As described herein, the net charge on the silica particles of which the inventive aqueous dispersion is comprised can be qualitatively determined by measuring the zeta potential of the dispersion (e.g., using a Matec MBS 8000 or a Brookhaven Zeta Plus instrument). A negative zeta potential is indicative of a net negative charge on the silica particles, while a positive zeta potential indicates a net positive charge. The magnitude of the zeta potential is proportional to the magnitude of the charge. As described herein, it is believed that contacting a silica particle (e.g., pyrogenic silica) with one or more aluminum compounds as set forth above causes one or more suitable aluminum compounds to become associated with or bind to the surface of the silica particle, possibly covalently or through an electrostatic interaction, to form a cationic coating thereon (i.e., cationic silica). As this cationic coating forms, the zeta potential increases and eventually approaches a maximum value.

For many applications, it is desirable that the net charge on the cationic silica comprising the inventive aqueous dispersion is at or near the maximum positive charge that can be obtained by coating the particles with one or more aluminum compounds, as set forth herein. More preferably, the coating or contact is achieved without a substantial excess (most preferably, without any excess) of the aluminum compound(s). Such a state of the cationic silica with respect to the aluminum compound(s) can be determined in any suitable manner, e.g., by reference to the zeta potential of the inventive aqueous dispersion. It is preferred that the zeta potential of the aqueous dispersion of the present invention at a particular pH is near the maximum zeta potential that can be obtained by means of contacting the silica particles with one or more aluminum compounds, as set forth above.

As also indicated above, it is preferred that the aqueous dispersion of the present invention does not comprise a large excess of the aluminum compound(s) with which the silica suspension has been contacted. When silica particles are contacted with one or more aluminum compounds as described herein to form a mixture, the zeta potential of the mixture increases rapidly at first, but then more slowly, such that additional contact with the aluminum compound(s) does not result in a significant increase in either cationic charge or zeta potential, but rather results in an increased concentration of aluminum salts in the dispersion. As the presence of salts can destabilize a dispersion (i.e., cause it to thicken and/or gel), it is preferred that the aqueous dispersion of the present invention comprises cationic silica particles (as described herein) in an amount sufficient to maximize the positive charge thereon, without causing an undesirable increase in the salt concentration of the dispersion.

The zeta potential characteristics of the aqueous dispersion of the present invention are as described herein in conjunction with the recording medium and its preparation.

The salt content of an aqueous dispersion can be qualitatively determined by measuring the electrical conductivity of the dispersion. Although the aqueous dispersion of the present invention can have any suitable salt content and electrical conductivity (as described herein), it is often desirable to minimize the salt content of a dispersion in order to improve the stability thereof. In certain embodiments of the present invention it is thus preferred that the inventive aqueous dispersion has an electrical conductivity of less than about 20,000 $\mu$siemens ($\mu$S). More preferably, the electrical conductivity is less than about 15,000 $\mu$S, even more preferably less than about 10,000 $\mu$S, still more preferably less than about 7,000 $\mu$S, and most preferably the electrical conductivity of the inventive aqueous dispersion in these embodiments is less than about 5,000 $\mu$S.

Although any suitable method can be used to prepare the aqueous dispersion of the present invention, it is preferred that the dispersion is prepared according to the methods described herein. Accordingly, the present invention provides a method of preparing an aqueous dispersion of cationic silica, which method comprises:

(a) providing an aqueous suspension of silica particles, wherein the mean diameter of the particles is less than about 1 $\mu$m, and (b) contacting the silica particles in the suspension with an aluminum compound to form a mixture, wherein the zeta potential of the mixture increases rapidly during the initial contacting, but plateaus (i.e., increases slowly) during subsequent contacting, and the contacting is continued until the zeta potential of the mixture plateaus, at which time the contacting is discontinued to provide the aqueous dispersion of cationic silica.

The inventive method of preparing an aqueous dispersion of cationic silica overcomes the limitations of previous methods in a number of ways. For example, it is not necessary to rigorously remove electrolytes (i.e., salts) from the dispersion. Also, dispersion stabilizers such as divalent metals, ammonia, and bicarbonate are not needed.

The various aspects of the inventive method and the aqueous dispersion produced thereby (e.g., pH, zeta potential, stability, cationic silica content, electrical conductivity, etc.), and the components thereof (e.g., cationic silica, silica particles, aluminum compound(s), liquid media, etc.), are as described herein with respect to the aqueous dispersion of the present invention, with the exception that the diameters of the silica particles of which the cationic silica is comprised are as described herein with respect to the recording medium of the present invention (i.e., having a mean diameter of less than about 1 $\mu$m).

The aqueous suspension can be prepared in any suitable manner, and comprises a liquid medium and silica particles having properties as described herein. For example, wet silica (e.g., colloidal silica) can be used substantially as prepared (e.g., via an acidified solution of sodium silicate). Alternatively, dry silica particles (e.g., pyrogenic silica particles) can be mixed with a suitable liquid medium (e.g., deionized water), preferably in a high shear mixer, to provide the initial suspension. When the silica suspension comprises pyrogenic silica and deionized water, the method of the present invention is particularly advantageous in that the suspension is substantially salt-free, thus obviating any need to remove electrolytes therefrom, for example, via dialysis or contact with an ion-exchange resin.

The suspension can have any suitable pH. In certain embodiments of the present inventive method, however, such as when it is desirable to keep the pH of the suspension and the resulting dispersion within a relatively narrow range (e.g., within about 2 pH units), it is preferred that the suspension has a pH of less than about 6. The pH of the suspension in these embodiments is more preferably less than about 5 (e.g., about 3–5), and most preferably about 3–4 or 3.5–4.5. The pH of the suspension can be adjusted using any suitable method, as described herein with respect to the aqueous dispersion of the present invention.

The suspension can have any suitable silica content. For example, the suspension can have approximately the same silica content as the aqueous dispersion prepared therefrom. Alternatively, the suspension can have a higher silica content, and the resulting dispersion can be diluted (e.g., with deionized water) to provide a final dispersion having a cationic silica content of from about 5% to about 50% by weight. The suspension also preferably has a silica content of from about 5% to about 50% by weight, such as from about 10% to about 30% by weight.

Any suitable method can be used to contact the silica suspension (and thereby the silica particles) with the aluminum compound, as described herein. Two features of the inventive method are that the contact between the aluminum compound(s) and the silica particles can be readily optimized, and the results of the contact (i.e., formation of a positively charged aluminum coating on the silica particles) readily monitored, e.g., by measuring the zeta potential of the mixture during the contacting. As described herein, the zeta potential of the mixture increases from negative (i.e., the silica particles have an anionic surface) to positive (i.e., the silica particles acquire a cationic surface) during the contacting, and eventually plateaus when the particles have achieved a maximum net positive charge. It is preferred that the contacting, e.g., the addition of the aluminum compound(s) to the silica suspension, is discontinued when, or very soon after, the zeta potential initially plateaus to produce the aqueous cationic silica dispersion of the present invention.

Alternatively, a zeta potential curve can be plotted for the mixture that is formed as a silica suspension is contacted with one or more aluminum compounds, and the data from the curve then can be used to prepare future dispersions. For example, the zeta potential of the mixture that is formed as an aqueous solution of aluminum chlorohydrate (e.g, 2 M) is added to an aqueous suspension of pyrogenic silica in deionized water (e.g., 10% by weight) can be measured and plotted well past the initial plateau to provide a zeta potential curve for that system. An aqueous dispersion comprising cationic silica can then be prepared from a silica suspension and one or more aluminum compounds, preferably in dry form (i.e., the aluminum compound preferably is not in the form of a solution), that are similar or substantially identical to those used to create the curve by contacting the suspension and aluminum compound(s) in amounts corresponding to those which produced the initial plateau in the zeta potential curve.

Using the method of the present invention, it is not necessary to know the electrolyte concentration of the suspension or dispersion. Moreover, aqueous dispersions prepared according to the method of the present invention need not be stabilized with additives such as divalent metals, ammonia, or bicarbonate.

The inventive recording medium, aqueous dispersion, coating composition, and methods for the preparation thereof can be further understood by reference to the following examples. These examples illustrate the present invention and, of course, should not be construed as in any way limiting its scope.

EXAMPLE 1

This example illustrates the generation of a zeta potential curve useful in the preparation of dispersion of the present invention.

A 10% by weight silica suspension having a pH of about 3 (220 ml) was added to the mixing vessel of a Matec® Zeta Potential Analyzer. While mixing, a titration was performed by incrementally adding a 2M solution of $Al_2(OH)_5Cl$ (aluminum chlorohydrate, ACH) in deionized water, and the zeta potential was monitored during the ACH addition. The resulting zeta potential curve is illustrated in FIG. 1.

Before adding the ACH solution, the suspension had a zeta potential of about −2 mV. During the addition of the first three ml of ACH, the zeta potential increased to about 9 mV; during the addition of the next three ml, the zeta potential increased to about 17 mV; during the addition of the next three ml, the zeta potential increased to about 23 mV; during the addition of the next three ml, the zeta potential increased to about 25 mV; during the addition of the next three ml, the zeta potential increased to about 27 mV; during the addition of the next three ml (18 ml total), the zeta potential increased to about 28 mV (at a pH of about 3.6), and at this time the addition was discontinued, as the zeta potential had begun to plateau, thus providing the aqueous dispersion of the present invention.

The viscosity of this dispersion was found to be substantially unchanged after standing at a temperature of about 25° C. for 100 days. The zeta potential of a dispersion prepared in the same manner increased to about 30 mV (i.e., increased by about 7%) upon addition of 9 more ml of ACH (to a total of 27 ml) thereto while the dispersion was rapidly mixed in a high shear mixer. In contrast, the zeta potential of another dispersion prepared in the same manner as set forth above decreased to about 23 mV (i.e., decreased by about 18%) when an additional 10 kg of pyrogenic silica was added thereto while the dispersion was rapidly mixed in a high shear mixer.

This example shows that the suspended silica particles, which are initially negatively charged, become positively charged as aluminum chlorohydrate is added, and that the magnitude of the positive charge increases very rapidly at first (i.e., during the addition of the first 10 ml or so of ACH), then more slowly (i.e., during the addition of the next 5 ml or so of ACH), and then very slowly (i.e., above 15 ml or so) as the zeta potential plateaus. If the addition is terminated soon after the zeta potential plateaus, the zeta potential increases modestly upon addition of more ACH.

EXAMPLE 2

This example illustrates the preparation of an aqueous cationic silica dispersion of the present invention using the zeta potential curve generated in Example 1.

A 10% by weight silica suspension having a pH of about 3 was prepared in a 380 liter capacity high shear mixer by charging the mixer with 90 liters deionized water, 150 ml concentrated HCl, and 10 kg pyrogenic silica (CAB-O-SIL® HS-5 (Cabot Corporation), surface area =300±25 $m^2/g$, average aggregate diameter=170–250 nm). To the rapidly mixed suspension in the high shear mixer was slowly added a 2 M solution of $Al_2(OH)_5Cl$ (aluminum chlorohydrate, ACH) in deionized water, and the zeta potential was monitored as a function of the amount of aluminum chlorohydrate added to the suspension.

As shown in FIG. 1, the zeta potential initially rapidly increases and then plateaus with the addition of an increasing amount of ACH to the suspension.

EXAMPLE 3

This example illustrates the preparation of the aqueous dispersion of the present invention using the zeta potential curve of FIG. 1.

A 15% by weight silica suspension having a pH of about 2.5–3 was prepared in a 60 liter capacity high shear mixer by initially charging the mixer with about 28 liters deionized water, about 50 g concentrated HCl and about 5.25 kg pyrogenic silica (CAB-O-SIL® HS-5 (Cabot Corporation), surface area=300±25 $m^2/g$, average aggregate diameter=170–250 nm). The suspension was rapidly mixed in the high shear mixer for about one hour, after which to the rapidly mixed suspension in the high shear mixer was added about 1.8 kg aluminum chlorohydrate solid to achieve a substantially maximum cationic charge on the silica without a significant excess of aluminum chlorohydrate, based on the zeta potential curve of FIG. 1 generated in Example 2. The suspension was further rapidly mixed for about 0.5 hour to form an aqueous dispersion of the present invention having about 20% by weight solids based on the total silica and aluminum chlorohydrate.

EXAMPLE 4

This example illustrates the preparation of a coating composition of the present invention. An aqueous dispersion of cationic silica was prepared in accordance with Example 3. The dispersion had a solids content of about 20% by weight cationic silica solids (based on the combined weight of silica and aluminum chlorohydrate). The dispersion had a specific gravity in the range of 1.05–1.35 $g/cm^3$ (at 25° C.) and a pH in the range of 3.0–4.0. Sufficient polyvinyl alcohol binder solution (PVOH) was added to obtain a pigment to binder ratio of 4:1 by weight (cationic silica to PVOH) and a total solids content (including cationic silica and binder) of 21.34%. Thus produced was a coating composition having a viscosity of 932 centipoise, as measured in a Brookfield Model RVT digital viscometer, spindle no. 5 at 100 RPM. The coating composition thus produced had excellent rheological properties and was suitable for use in the production of recording media.

EXAMPLE 5

This example illustrates the preparation of a recording medium of the present invention. An uncoated paper substrate base was coated with the coating composition of Example 4 using a Meyer rod (hand draw-down). The Meyer rod was selected to produce a final coating weight of 8 $g/m^2$. The coated samples were allowed to air dry until they were dry to the touch. The dry samples were then cut into 5" (12.7 cm) diameter circles using a punch press. The samples were dried in a CEM Labwave Oven 9000 microwave moisture analyzer. The coat weights of the samples were then determined by taking the difference between the weights of the dry coated and uncoated samples. The samples were then conditioned in a humidity-controlled room before performing optical and physical property measurements.

Samples were calendered on one side with 3 nips at 7 pli (pounds per linear inch) (1.25 kg/linear cm) and 60° C. The optical, surface and printing properties were measured for the calendered samples, and the results were compared to the uncalendered samples.

The uncoated paper substrate had the following properties: basis weight: 77.5 $g/m^2$; pH: 6.6; ash: 8.31%; caliper 3.62/1000" (91.9 μm); brightness: 82.7%; gloss: 6.4%; smoothness: 3.93 μm; Hercules® sizing test: 109 sec; and PPS porosity: 2.77 ml/min. The recording media obtained by coating the substrate in accordance with this example had excellent gloss, brightness, and porosity. The coating had an excellent appearance and superior feel, and did not crack or exhibit brittleness. Moreover, the recording media produced an excellent printed image.

Brightness was measured using a Technidyne® Brightness Meter Tappi Procedure T 452 OM-92. Gloss was measured using a Hunter 75° degree gloss meter according to TAPPI standard procedure T 480OM-92. The surface smoothness and porosity of the sheets were measured using a Parker Print Surf (PPS) tester (TAPPI T555 PM-94). The rate of liquid absorption of the papers was measured using a First 10 Angstrom Dynamic Contact Angle measuring device.

The properties of the recording media (uncalendered and calendered) are shown below in Table 1.

TABLE 1

| Meduim | Brightness (%) | 75° Specular Gloss (%) | PPS Smoothness ($\mu$m) | Porosity (ml/min.) |
|---|---|---|---|---|
| Uncoated Substrate | 82.7 | 6.4 | 3.93 | 2.77 |
| Coated Substrate (8 g/m$^2$) | 84.6 | 13.2 | 3.29 | 263 |
| Calendered (8 g/m$^2$) | 83.3 | 45.4 | 1.71 | 65.5 |

The samples were printed on Epson Stylus® Pro Photorealistic and Hewlett Packard® 820C ink jet printers using a test pattern created with ADOBE® software. The print gloss and print density of the samples was then measured. Print gloss was measured using a Gardener 60 degree Micro-Gloss meter. Print density was measured using a BYK Gardner® densitometer. The properties of the image as printed using the Epson® Stylus Pro Photorealistic and the Hewlett Packard® 820C are shown in Tables 2A and 2B, respectively.

TABLE 2A

| | Epson Stylus ® Pro ES Wide Format | | | | | |
|---|---|---|---|---|---|---|
| Medium | Black | Cyan | Magenta | Yellow | Ink Gloss | Coating Gloss |
| Coated Substrate (8 g/m$^2$) | 1.60 | 0.72 | 1.03 | 0.71 | 1.23 | 13.2 |
| Calendered (8 g/m$^2$) | 1.64 | 0.71 | 1.02 | 0.78 | 9.80 | 45.4 |

TABLE 2B

| | Hewlett Packard ® 820C | | | | | |
|---|---|---|---|---|---|---|
| Medium | Black | Cyan | Magenta | Yellow | Ink Gloss | Coating Gloss |
| Coated Substrate (8 g/m$^2$) | 1.68 | 1.26 | 1.40 | 0.97 | 11.5 | 13.2 |
| Calendered (8 g/m$^2$) | 1.80 | 1.28 | 1.52 | 1.03 | 10.0 | 45.4 |

These results demonstrate that the recording media produced in accordance with this example exhibited excellent optical, physical, and textural properties, as indicated by the high measured values for gloss (low PPS smoothness), and the high measured values for brightness and porosity. These results also demonstrate the excellent quality of printed images attainable using such recording media, as indicated by the high values for ink density using several representative colors, as well as high ink gloss values.

EXAMPLE 6

This example illustrates the compatibility of a cationic silica coating composition of the present invention in the presence of a mordant, as compared to the mordant compatibility of a comparative composition comprising untreated silica. A mordant is a cationic polymer used in coating compositions to improve dye immobilization properties and waterfastness of ink-jet recording media. It is highly desirable for the pigment particles of a coating composition to exhibit good mordant compatibility so that there will be an improvement in the final coating and an ultimate improvement in coater runnability.

In this example, a cationic silica coating composition of the present invention was prepared in accordance with Example 4, except that the total solids content was 20% by weight and the pigment to binder ratio was 5:1 ("cationic silica composition"). A comparative coating composition (20% solids content by weight and a pigment to binder ratio of 5:1) also was prepared using the procedure of Example 4, except that the silica particles of the initial dispersion were not treated ("untreated silica composition"). The cationic silica composition of the present invention used in this example was prepared from the cationic silica dispersion prepared in accordance with Example 3. The untreated silica composition was prepared from a dispersion of the same pyrogenic silica described in Example 3 (i.e., CAB-O-SIL® HS-5 (Cabot Corporation), surface area=300±25 m$^2$/g, average aggregate diameter=170–250 nm), except that the pyrogenic silica was not contacted with an aluminum reagent. The binder used in both cationic and untreated silica compositions was Airvol® 203 PVOH (available from Air Products and Chemicals, Inc., Allentown, Pa.).

Viscosity was measured for the cationic and untreated silica compositions in the absence of mordant and in the presence of different concentrations of mordant. Compatibility studies were carried out using two different mordants. The mordants used in this example were medium molecular weight poly(diallylmethyl-ammonium chloride) (Poly DAMAC (Medium MW)), and high molecular weight poly (diallylmethylammonium chloride) Poly DAMAC (High MW)), both of which are available from Aldrich Chemical Company, Milwaukee, Wis.

All viscosities were measured in a Brookfield Model RVT digital viscometer, spindle no. 5 at 100 RPM, after 30 seconds. The results are shown in Tables 3A and 3B. Percent mordant (%) represents the percent of mordant by weight relative to the combined weight of silica, PVOH binder, and water.

TABLE 3A

| Sample | % Poly DMAC | Viscosity (centipoises) |
|---|---|---|
| | (Medium MW) | |
| Untreated Silica Composition (comparative) | 0 | 79.2 |
| | 0.5 | 1492 |
| | 1.0 | (Gelled) |
| Cationic Silica Composition (invention) | 0 | 110 |
| | 0.5 | 276 |
| | 1.0 | 596 |
| | 1.5 | 986 |
| | (High MW) | |
| Untreated Silica Composition (comparative) | 0 | 79.2 |
| | 0.5 | 1664 |
| | 1.0 | (Gelled) |
| Cationic Silica Composition (invention) | 0 | 110 |
| | 0.5 | 324 |
| | 1.0 | 636 |
| | 1.5 | 1086 |

These results demonstrate that the cationic silica composition of the present invention has superior mordant compatibility as compared to the mordant compatibility of an analogous untreated silica composition. At 1.0% by weight of mordant, the untreated silica composition gelled, whereas the cationic silica composition of the present invention had viscosities of 596 and 636 centipoises for medium and high molecular weight mordants, respectively.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A recording medium comprising a substrate having a glossy coating thereon, wherein said glossy coating comprises cationic silica particles having a mean diameter of less than about 1 $\mu$m, and wherein said particles comprise pyrogenic silica that has been contacted with at least one aluminum compound selected from the group consisting of aluminum halides and aluminum nitrates.

2. The recording medium of claim 1, wherein the mean diameter of said particles is less than about 400 nm.

3. The recording medium of claim 1, wherein the mean diameter of said particles is at least about 100 nm.

4. The recording medium of claim 1, wherein substantially all of said particles have diameters of less than about 1 $\mu$m.

5. The recording medium of claim 1, wherein substantially all of said particles have diameters of less than about 500 nm.

6. The recording medium of claim 1, wherein substantially all of said particles have diameters of at least about 100 nm.

7. The recording medium of claim 1, wherein said substrate comprises a polymer or cellulose paper.

8. The recording medium of claim 7, wherein said substrate comprises poly(ethylene terephthalate).

9. The recording medium of claim 1, wherein said aluminum halide is selected from the group consisting of aluminum chlorides.

10. The recording medium of claim 1, wherein said aluminum halide is aluminum chlorohydrate.

11. The recording medium of claim 1, wherein said glossy coating has a total mercury intrusion volume of at least about 0.3 ml/g.

12. The recording medium of claim 1, wherein said recording medium, when calendered, has a 75° specular gloss of at least about 15%.

13. The dispersion comprising cationic silica and water, wherein:
(a) said cationic silica comprises pyrogenic silica particles that have been contacted with at least one aluminum compound,
(b) the mean diameter of said pyrogenic silica particles is from about 100 nm to about 1 $\mu$m,
(c) the pH of said dispersion is from about 2 to about 6,
(d) the content of said cationic silica in said dispersion is from about 5–50% by weight,
(e) said dispersion exhibits a viscosity of less than about 1500 centipoise after said dispersion is allowed to stand at a temperature of about 25° C. for 60 days immediately following the preparation thereof, and
(f) the zeta potential of said dispersion is at least about 50% of the maximum zeta potential without the presence of a substantial excess of aluminum.

14. The dispersion of claim 13, wherein the pH of said dispersion is from about 3–5.

15. The dispersion of claim 13, wherein the mean diameter of said particles is from about 100–400 nm.

16. The dispersion of claim 13, wherein substantially all of said particles have diameters of from about 100 nm to about 1 $\mu$m.

17. The dispersion of claim 13, wherein substantially all of said particles have diameters of from about 100–500 nm.

18. The dispersion of claim 13, wherein the content of said silica in said dispersion is from about 10–30% by weight.

19. The dispersion of claim 13, wherein said aluminum compound is selected from the group consisting of aluminum halides and aluminum nitrates.

20. The dispersion of claim 13, wherein said aluminum compound is selected from the group consisting of aluminum chlorides.

21. The dispersion of claim 13, wherein said aluminum compound is aluminum chlorohydrate.

22. The dispersion of claim 13, wherein said dispersion has a viscosity of less than about 500 centipoise after said dispersion is allowed to stand at a temperature of about 25° C. for 60 days immediately following the preparation thereof.

23. The dispersion of claim 13, wherein said dispersion exhibits a zeta potential of at least about 60% of the maximum zeta potential without the presence of a substantial excess of aluminum.

24. The dispersion of claim 13, wherein said dispersion exhibits a zeta potential of at least about 80% of the maximum zeta potential without the presence of a substantial excess of aluminum.

25. The dispersion of claim 13, wherein said dispersion exhibits a zeta potential of at least about 90% of the maximum zeta potential without the presence of a substantial excess of aluminum.

26. A method of preparing the dispersion of claim 14, said method comprising:
(a) providing an aqueous suspension of silica particles, wherein the mean diameter of the particles is less than about 1 $\mu$m, and
(b) contacting said silica particles in said suspension with at least one aluminum compound, wherein the zeta potential of said mixture increases rapidly during the initial contacting, but plateaus during subsequent contacting, and the contacting is continued until the zeta potential of the mixture plateaus, at which time the contacting is discontinued to produce said aqueous dispersion of cationic silica.

27. A coating composition comprising a binder and the dispersion of claim 13.

28. A method of preparing a recording medium, said method comprising:
(a) providing a substrate,
(b) coating said substrate with the coating composition of claim 27, to produce a coated substrate, and
(c) drying said coated substrate to produce said recording medium.

29. The method of claim 28, wherein said substrate comprises a polymer or cellulose paper.

30. The method of claim 28, wherein said substrate comprises poly(ethylene terephthalate).

31. The method of claim 28, wherein the coating on said recording medium has a total mercury intrusion volume of at least about 0.3 ml/g.

32. The method of claim 28, wherein said recording medium has a 75° specular gloss of at least about 15%.

33. A recording medium prepared according to the method of claim 28.

* * * * *